PATENTED APR 18 1972

INVENTORS
CHARLES R. LARSON
ROBERT H. DUDLEY
BY
ATTORNEY

United States Patent
Larson et al.

[15] 3,656,620
[45] Apr. 18, 1972

[54] CONTINUOUS CHIP PROCESSING SYSTEM

[72] Inventors: Charles R. Larson, Bellevue; Robert H. Dudley, Kalamazoo, both of Mich.

[73] Assignee: Prab Conveyors, Inc., Kalamazoo, Mich.

[22] Filed: Feb. 26, 1970

[21] Appl. No.: 14,312

[52] U.S. Cl..............................210/110, 210/112, 210/144, 210/147
[51] Int. Cl.........................................B04b 13/00
[58] Field of Search......................210/78, 85, 110, 112, 113, 210/145, 147, 144

[56] References Cited

UNITED STATES PATENTS 2,906,466 9/1959 Hopper..............................210/145 X
3,497,386 2/1970 Steele et al..........................210/145 X Primary Examiner—Jim DeCesare
Attorney—Gordon W. Hueschen and Talivaldis Cepuritis

[57] ABSTRACT

Continuous system for separating a liquid from a liquid-solid admixture comprises a feed conveyor means for transporting the admixture, an electrically-driven centrifugal separator and control means therefor, a discharge conveyor means for receiving and transporting away the separated solids, and a feed conveyor control means responsive to the rotational speed of the separator so that the feed conveyor is operable only when the separator is operating at a predetermined speed.

11 Claims, 3 Drawing Figures

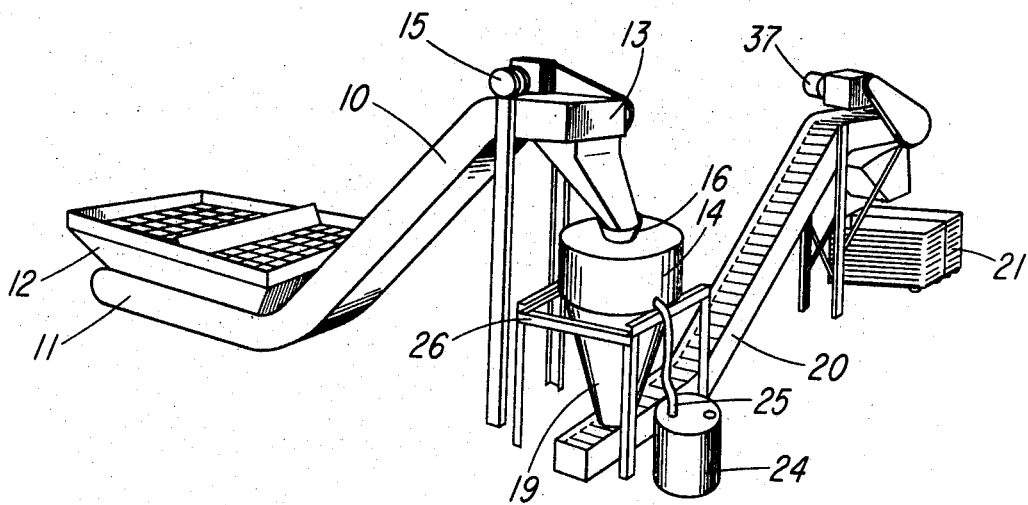

INVENTORS
CHARLES R. LARSON
ROBERT H. DUDLEY
BY
ATTORNEY

CONTINUOUS CHIP PROCESSING SYSTEM

BACKGROUND OF THE INVENTION

Metal or plastic chips are generally produced during manufacturing processes on machines such as turret lathes, milling machines, drills, gear hobbers, boring mills, grinding wheels, and the like. In most instances cutting and/or cooling fluids are utilized during the aforementioned machining operations. Both the chips and the fluids possess substantial reclamation value.

It is known to recover such chips and fluids by centrifugation; however, heretofore such recovery has been carried out as a cumbersome and costly batch operation requiring repeated handlings of the materials and personnel to attend the machines. Chip processing operations presently known to the art are exemplified by U.S. Pat. No. 2,731,151 and U.S. Pat. No. 2,906,466; however, at best such operations can be characterized as semi-automatic batch operations which are slow and which require virtually constant operator attention.

It is an object of the present invention to provide an automated, continuous system for separating a liquid from a liquid-solid admixture, such as fluid-chip admixture, which is fast, reliable, and requires a minimum of attention. Still other objects will readily present themselves to one skilled in the art upon reference to the ensuing specification, the drawings, and the claims.

SUMMARY OF THE INVENTION

The continuous chip processing system of the present invention comprises a feed conveyor means for transporting the chips to be processed, an electrically-driven centrifugal separator means adapted to separate a liquid phase from the solid material, a discharge conveyor means adapted to receive and to transport away the separated solid material, and feed conveyor control means which is responsive to the rotational speed of the centrifugal separator so that the feed conveyor means is operable only when the centrifugal separator is operating at a predetermined speed.

DESCRIPTION OF THE PREFERRED EMBODIMENTS

Figure 1:
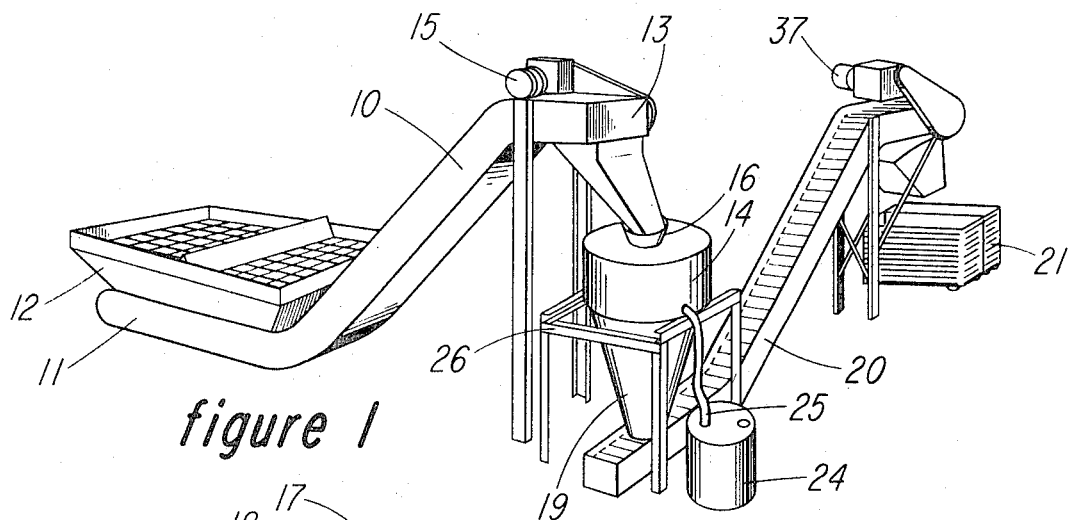
FIG. 1 is a perspective view of a typical system of the present invention including a feed conveyor, a centrifugal separator, and a discharge conveyor.
Figure 2:
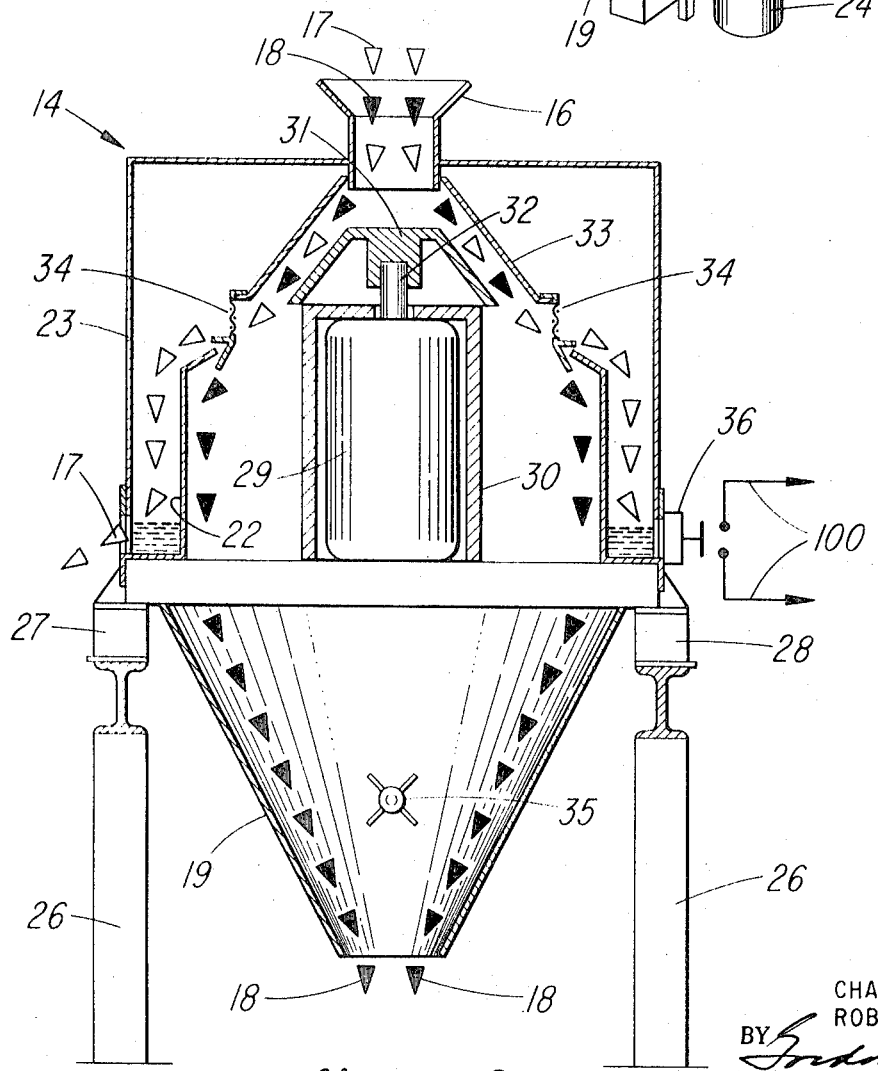
FIG. 2 is an elevation of a centrifugal separator partially broken away to show interior detail.

Referring to FIG. 1, a feed conveyor 10 driven by motor 15, having a receiving end 11 provided with a grated hopper 12 and discharge end 13, is adapted to receive a liquid-solid admixture of materials and to transport the same to an electrically-driven centrifugal separator 14. The materials containing liquid 17 and solids 18 (FIG. 2) are received in separator 14 through a charging hopper 16, separated, and discharged.

The separated solids 18 drop into product hopper 19, are deposited on discharge conveyor 20 driven by motor 37 and are transported away to storage in suitable containers such as bins 21. If desired, the separated solids can be discharged directly into suitable containers without the use of discharge conveyor 20; however, for more expeditious operation of the system and in order to minimize labor requirements the use of a discharge conveyor is preferred.

The separated liquid 17 collects in a trough 22 around the periphery of centrifuge housing 23 and is withdrawn therefrom into a suitable storage container 24 via conduit 25.

Separator 14 is mounted on a suitable frame 26 by means of vibration-dampening suspensions 27 and 28 and comprises a centrally situated motor 29 disposed in a motor housing 30. A rotary distributing cone 31 is mounted above motor 29 and is driven by shaft 32. A separating bowl 33, provided with a peripheral screen 34, envelops motor 29 and cone 31. During operation the liquid-solid admixture is received on cone 31 through charging hopper 16 and a high linear velocity is imparted to both solid particles 18 and liquid particles 17. As the incoming feed pushes the rotating particles further down cone 31, liquid particles 17 separate and pass through screen 34 and solid particles 18 drop into product hopper 19. A solids level sensor 35 is provided in hopper 19 to signal an undesired solids buildup therein. Sensor or indicating means 35 is conveniently of the rotating vane type, however, any suitable solids level indicator can be employed. Also, a limit switch 36 is mounted on centrifuge housing 23 so as to detect oscillations or vibrations of centrifugal separator 14 resulting from an imbalance condition within.

Figure 3:
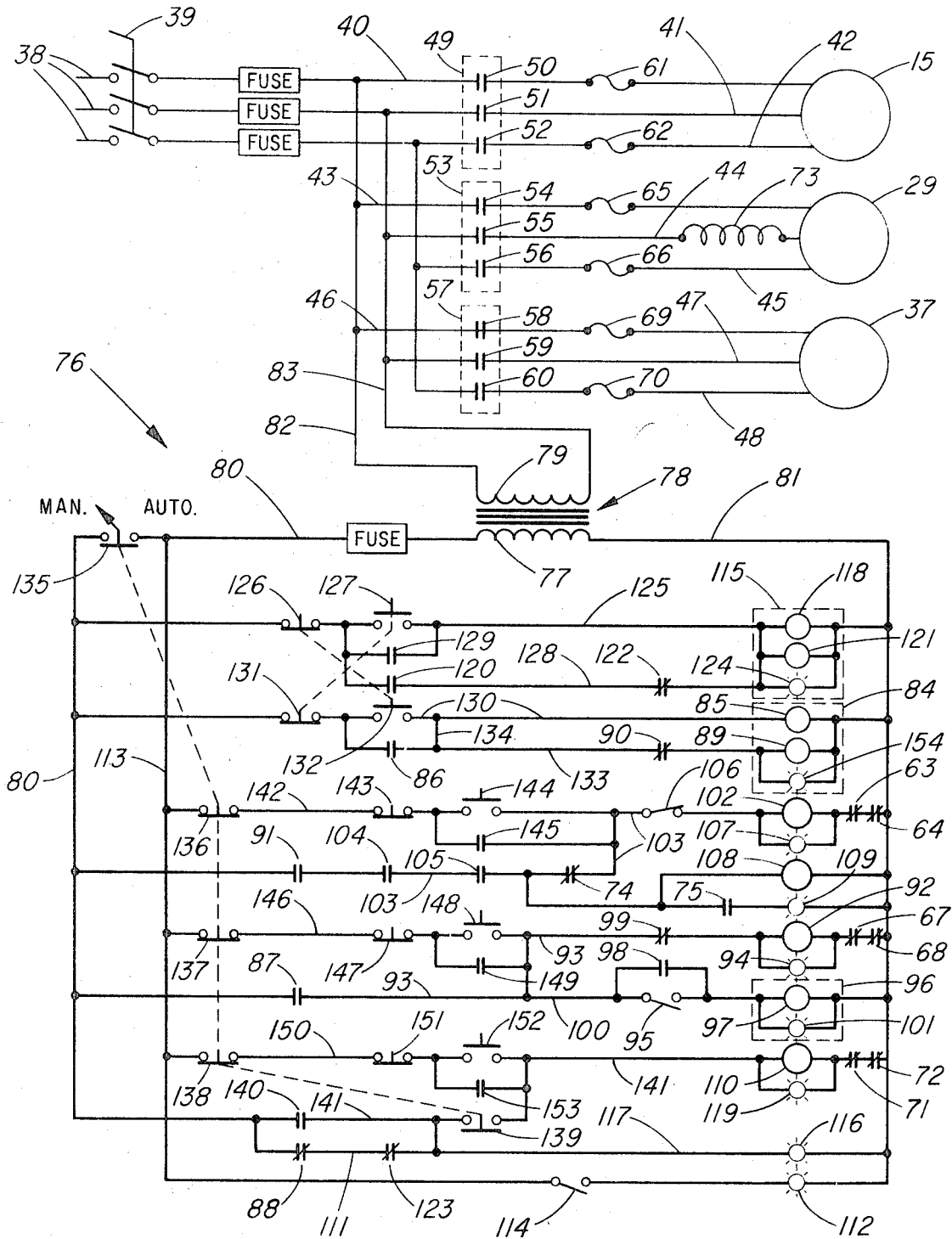
FIG. 3 is a control circuit diagram of the continuous chip processing system of this invention.

Referring to FIG. 3, feed conveyor motor 15, separator motor 29, and discharge conveyor motor 37, are energized from a power line 38, which is conveniently a three phase 440 V line, through switch 39 which is suitably connected to lines 40, 41, and 42 leading to feed conveyor motor 15, lines 43, 44, and 45 leading to separator motor 29, and lines 46, 47, and 48 leading to discharge conveyor motor 37. A contactor 49 is operably connected in lines 40, 41, and 42 and provided with respective power contacts 50, 51, and 52 for these lines. Similarly contactor 53 provides power contacts 54, 55, and 56 for lines 43, 44, and 45, respectively, and contactor 57 provides power contacts 58, 59, and 60 for lines 46, 47, and 48, respectively.

Normally closed overload switches 61 and 62 are operably connected in lines 40 and 42 and adapted to operate switching contacts 63 and 64. Similarly overload switches 65 and 66 are provided in lines 43 and 45, respectively, and adapted to operate switching contacts 67 and 68, and overload switches 69 and 70 are provided in lines 46 and 48, respectively, and adapted to operate switching contacts 71 and 72. An instantaneous overload indicator 73 is connected in line 44 between power contacts 55 and separator motor 29, and is adapted to operate normally closed switching contacts 74 and normally open switching contacts 75.

Control circuitry 76 derives its power from the secondary windings 77 of transformer 78 via lines 80 and 81, the primary windings 79 thereof being connected across lines 40 and 41 by means of lines 82 and 83. In the alternative, control circuitry 76 could derive its energizing power directly from the power line 38 if such a high voltage was desired. Normally this is not the case, however. In the embodiment shown in FIG. 3 the voltage across secondary winding 77 is 120 volts.

In order to minimize excessive current demand on starting up the entire system, a timer 84 is optionally provided in the circuit and comprises a clutch 85 which operates instantaneous contacts 86, 87, and 88, and timer motor 89 which operates delayed contacts 90 and 91. An indicator light 154 is connected in parallel with motor 89 to show when the latter is operating.

The starter coil 92 of separator motor 29 is connected in control circuit 76 across lines 80 and 81 by means of line 93, and is energized by instantaneous contacts 87 of timer 84. An indicator light 94 is connected in parallel with starter coil 92. Limit switch 36 which detects separator imbalance is provided with switching contacts 95 which are normally open and are connected with relay 96 in series with relay coil 97. Relay 96 is further provided with normally open contacts 98 and normally closed contacts 99, the latter being connected in line 93 between instantaneous timer contacts 87 and starter coil 92 of the separator motor 29. Limit switch contacts 95 are in parallel with normally open relay contacts 98 and are connected across starter coil 92 and normally closed contacts 99 by line 100. Relay 96 is also provided with an indicator light 101 across coil 97.

The starter coil 102 of feed conveyor motor 15 is connected in control circuit 76 across lines 80 and 81 by line 103 and is energized by the closing of auxiliary contacts 104 of contactor 53, auxiliary contacts 105 of contactor 57, and delayed closing contacts 91 of timer 84. Normally closed contacts 74 of instantaneous overload indicator 73 and normally closed switching contacts 106 of solids level sensor 35 are also connected in line 103 between the aforesaid energizing contacts 91, 104, and 105 and starter coil 102. Indicator light 107 is connected in parallel with starter coil 102. Motor 108 of solids level sensor 35 is connected across line 81 and line 103 between contacts 91, 104, and 105 and the normally closed contacts 74 of instantaneous overload indicator 73. Normally open contacts 75 of indicator 73 and an indicator light 109 for signifying overload of separator 14 are series-connected to line 81 and in parallel with motor 108 of sensor 35.

High solids level indicator 112 is connected across lines 80 and 81 by line 113 and is energizable by normally open switching contacts 114 which are adapted to be closed by the action of sensor 35.

Starter coil 110 of discharge conveyor motor 37 is connected in control circuit 76 across lines 80 and 81 by line 141 and is energized by closing auxiliary contacts 140 of contactor 53 upon energization of coil 92. Delayed opening contacts 123 of timer 115 are connected in series with normally closed instantaneous contacts 88 of timer 84 across auxiliary contacts 140 by line 111. Indicator light 116 adapted to signify ON condition of the system when energized is connected to line 81 and between delayed opening contacts 123 and auxiliary contact 140 by line 117. Indicator light 119 is connected in parallel with coil 110 so as to be energized when coil 110 is energized.

Timer 115 is provided in control circuit 76 to permit operation of discharge conveyor 20 for a predetermined time period after separator 14 is shut down. Timer 115 comprises clutch 118 which operates instantaneous contacts 120 and timer motor 121 which operates delayed opening contacts 122 and 123. An indicator light 124 is connected in parallel with motor 121 to show when the latter is operating.

Timer 115 is connected in control circuit 76 across lines 80 and 81 by means of line 125 having switching contacts 126 and 127 series connected therein, and by means of line 128 having instantaneous contacts 120 and delayed opening contacts 122 series connected therein. Line 128 has a common terminal with line 125 at timer 115 and is further connected in line 125 between switching contacts 126 and 127 the former contacts being adapted to reset timer 115 upon opening and the latter contacts being adapted to energize timer 115 upon closing. Normally open relay contacts 129 are connected across switching contacts 127 and are activated by relay coil 97 so as to energize timer 115 when separator 14 is shut down due to an imbalance condition therewithin.

Clutch 85 of timer 84 is connected in control circuit 76 across lines 80 and 81 by means of line 130 having switching contacts 131 and 132 connected therein in series. Motor 89 is connected across lines 130 and 81 by line 133 which is connected to line 130 between switching contacts 131 and 132. Normally open instantaneous contacts 86 and delayed opening contacts 90 of timer 84 are series-connected in line 133. Contacts 86 are also connected across switching contacts 132 by line 134.

While not essential for automatic operation of the present system, a manual override is provided so that during startup or maintenance each individual unit can be operated manually. Manual or automatic mode of operation is controlled by switching contacts 135 which are shown in FIG. 3 in the position occupied during manual operation, i.e., contacts 135 and 139 are open and contacts 136, 137, and 138 are closed. During automatic operation of the switching contacts 135 and 139 are closed and contacts 136, 137, and 138 are open.

Line 142 having series-connected switching contacts 136, 143, and 144 is connected to line 113 and to line 103 between normally closed switching contacts 74 of instantaneous overload indicator 73 and switching contacts 106 of solids level sensor 35. Auxiliary contacts 145 of contactor 49 are connected across switching contacts 144 and are adapted to close and remain closed as coil 102 is energized by the instantaneous closing of switching contacts 144 by means of a suitable push button. By the same token the circuit is interrupted by the instantaneous opening of switch contacts 143 which deenergizes coil 102 and thus open contacts 145.

Similarly, line 146 having series-connected switching contacts 137, 147, and 148 is connected to line 113 and to line 93 between instantaneous contacts 87 of timer 84 and normally closed contacts 99 of relay 96. Auxiliary contacts 149 of contactor 53 are connected across switching contacts 148 and are adapted to close and remain closed as coil 92 is energized by the instantaneous closing of switching contacts 148 by means of a suitable push button. Coil 92 is manually deenergized by the instantaneous opening of switching contacts 147 which then opens contacts 149.

Manual operation of the discharge conveyor is achieved by line 150 having series-connected switching contacts 138, 151, and 152. Line 150 is connected to line 113 and to coil 110 of motor 37 by means of line 141. Auxiliary contacts 153 of contactor 57 are connected across switching contacts 152 and are adapted to close and remain closed as coil 110 is energized by the instantaneous closing of switching contacts 152 by means of a suitable push button. Coil 110 is manually deenergized by the instantaneous opening of switching contacts 151 which then opens contacts 153.

For automatic operation of the present system switching contacts 135 and 139 are closed. Activation of SYSTEM START button deenergizes and resets timer 115 by opening switching contacts 126 and energizes timer 84 by closing switching contacts 132. At the same time instantaneous contacts 86 and 87 are closed energizing, respectively, timer motor 89 and starter coil 92 of separator motor 29. Also, instantaneous contacts 88 are opened, and starter coil 110 of discharge conveyor motor 37 energized through line 141 by closing auxiliary contacts 140 of contactor 53. This also energizes indicator light 116 signifying ON condition of the system.

Energizing of timer motor 89 starts running the time period after which delayed closing contacts 91 will close and delayed opening contacts 90 will open thereby shutting down timer 84. Duration of the time period may be selected as desired. Usually a time period of about 60 seconds or less is adequate. Energization of coils 92 and 110 closes auxiliary contacts 104 and 105, respectively, whereupon starter coil 102 for feed conveyor motor 15 is energized when contacts 91 close. When coil 102 is energized, power contacts 50, 51, and 52 of contactor 49 also close thereby starting motor 15. Similarly, energization of coil 92 closes power contacts 54, 55, and 56 of contactor 53 thereby starting motor 29, and energization of coil 110 closes power contacts 58, 59, and 60 of contactor 57 thus starting motor 37. Coils 92 and 110 must be energized so as to close auxiliary contacts 104 and 105 before motor 15 can be started.

As soon as the centrifugal separator 14 has reached normal operating speeds the current demand level reaches a predetermined minimum, contacts 74 of instant overload indicator 73 are closed, and contacts 75 remain open, the feed conveyor 10 is operational and can receive the liquid-solid admixture to be separated. In the event separator 14 becomes overloaded, contacts 74 will open deenergizing coil 102 and shutting down conveyor 10, and contacts 75 will close energizing indicator light 109. As soon as the overload condition is corrected, contacts 74 will automatically close and conveyor 10 will start up again.

Feed conveyor 10 is also shut down by a high materials level in product hopper 19 in which event motor 108 of rotating vane sensor 35 will stop, thereby opening switching contacts 106 which deenergize coil 102 and closing contacts 114 which energize indicator light 112.

An imbalance condition in separator 14 resulting, for example, from a relatively large chunk of material on distributing cone 31 causes separator to vibrate or oscillate excessively thereby tripping limit switch 36 whereupon switching contacts 95 are closed, energizing coil 97 of relay 96 and indicator light 101. As coil 96 is energized, normally open relay contacts 98 and 129 are closed, and normally closed relay contacts 99 are opened. Contacts 98 lock in relay coil 97 in an energized condition, contacts 99 upon opening deenergize coil 92 of motor 29 thus shutting down separator 14 to avoid damage thereto, and contacts 129 energize timer 115 so as to keep discharge conveyor 20 operating for a predetermined time period sufficient to transport away solid materials present in product hopper 19. Duration of this time period will vary depending on the capacity of conveyor 20 and product hopper 19; however, normally a time period of about 60 minutes or less is adequate.

Energizing of timer 115 closes instantaneous timer contacts 120 and starts timer motor 121 which opens delayed opening contacts 123 thereby shutting down discharge conveyor 20 by deenergizing coil 110 and shutting down timer 115 itself by opening contacts 122 after a predetermined timer period.

When separator 14 has shut down due to an imbalance condition therewithin, the imbalance circuit is reset by opening switching contact 131 thus deenergizing timer 84 and opening instantaneous contacts 87 which in turn deenergizes relay coil 97. The imbalance condition is then corrected and separator 14 is started again as set forth above by closing contacts 132 and opening contacts 126.

To shut down the automatic system of this invention at the end of an operating cycle or an operating day switching contacts 127 are closed and switching contacts 131 are opened by activating a suitable SYSTEM STOP button, thereby energizing timer 115 as set forth above, deenergizing and resetting timer 84, which opens instantaneous contacts 87 and delayed closing contacts 91, thus deenergizing coils 92 and 102 and stopping separator motor 29 and feed conveyor motor 15. Upon deenergizing timer 84 instantaneous contacts 88 close and complete the circuit of feed discharge conveyor starter coil 110 across lines 80 and 81 through line 111 so that discharge conveyor 20 continues to operate until delayed opening contacts 123 of timer 115 break the connection. Timer 115 is deenergized and reset upon activation of the SYSTEM START button for the next operating cycle.

The foregoing discussion of the preferred embodiments is illustrative but not limiting. Still other variations within the spirit and scope of this invention will readily present themselves to the skilled artisan.

We claim:

1. A continuous chip processing system separating a liquid from a liquid-solid admixture which comprises:
    feed conveyor means transporting said liquid-solid admixture and provided with a receiving end and a discharge end;
    electrically-driven centrifugal separator means receiving said liquid-solid admixture from the feed conveyor means discharge end and separating the liquid phase from the solid phase of said admixture, and provided with a liquid discharge outlet and a solids discharge outlet;
    centrifugal separator control means for starting and shut-down of said separator means operatively connected thereto;
    discharge conveyor means receiving said separated solids from said separator means through the solids discharge outlet thereof and transporting away said separated solids; and
    feed conveyor control means responsive to the rotational speed of said separator means and operatively connected to said feed conveyor means so that said feed conveyor means is operable only when said separator means is operating at a predetermined speed.

2. The system in accordance with claim 1 wherein said feed conveyor control means is responsive to electrical current demand of said separator means and is operatively connected to said feed conveyor means so that said feed conveyor means is operable only when said separator means is operating at a substantially constant current demand level.

3. The system in accordance with claim 2 wherein said feed conveyor control means shuts down said feed conveyor means when said separator means current demand level exceeds a predetermined amount.

4. The system in accordance with claim 2 wherein said feed conveyor control means starts said feed conveyor means when said separator means current demand reaches a predetermined level.

5. The system in accordance with claim 1 wherein said separator control means is additionally responsive to an imbalance condition within the separator means and is operatively connected with said feed conveyor control means so that both the separator means and the feed conveyor means are shut down when said imbalance condition occurs.

6. The system in accordance with claim 5 wherein said separator control means is further operatively connected to a discharge conveyor control means which shuts down said discharge conveyor means a predetermined time interval after the separator means is shut down.

7. The system in accordance with claim 1 wherein the separator means is provided with a solids level sensing means situated near the solids discharge outlet thereof and operatively connected to said feed conveyor control means whereby the feed conveyor means is shut down when the solids reach a predetermined level within said outlet and said solids level indicator means is activated.

8. The system in accordance with claim 7 wherein said feed conveyor control means restarts the feed conveyor means when the solids level within said solids discharge outlet decreases and the solids level sensing means is no longer activated.

9. The system in accordance with claim 7 wherein said feed conveyor control means is further responsive to the operation of said discharge conveyor means and is operatively connected thereto, so that said feed conveyor means is rendered inoperative when said discharge conveyor means stops operating.

10. The system in accordance with claim 7 wherein said feed conveyor control means is operatively connected to said discharge conveyor means so that said feed conveyor means cannot be started when said discharge conveyor means is electrically inoperative.

11. The system in accordance with claim 10 provided with signal indicator means indicating shut-down, normal, and abnormal operating conditions of the feed conveyor means, centrifugal separator means, and discharge conveyor means.

* * * * *